United States Patent [19]

Nohren

[11] 3,754,722
[45] Aug. 28, 1973

[54] SELF-LOCKING WINDING DEVICE FOR THE SAFETY BELT OF AIR AND LAND VEHICLES

[75] Inventor: Hubert Nohren, Halstenbek, Germany

[73] Assignee: Autoflug GmbH, Egenbuttel, Germany

[22] Filed: Apr. 20, 1971

[21] Appl. No.: 135,607

[30] Foreign Application Priority Data
Apr. 21, 1970 Germany.................... P 20 19 135.9

[52] U.S. Cl. ............................................ 242/107.4
[51] Int. Cl. ............................................ A62b 35/00
[58] Field of Search.................... 242/107 R, 107 S, 242/107 B, 107.4, 107.5, 107.6, 107.7; 297/388; 280/150 S B

[56] References Cited
UNITED STATES PATENTS

| 3,482,799 | 12/1969 | Wrighton et al. | 242/107.4 |
| 3,552,676 | 1/1971 | Weber | 242/107.4 |
| 3,450,368 | 6/1969 | Glauser et al. | 242/107.4 |
| 3,593,942 | 7/1971 | Rex | 242/107.4 |

*Primary Examiner*—Werner H. Schroeder
*Attorney*—Walter Becker

[57] ABSTRACT

A device for winding up one part of a safety belt for a passenger vehicle, especially a land or air vehicle. The device has a spring biased shaft to which the belt is connected so the belt is normally drawn into a housing. The belt can be pulled from the housing when the belt is to be placed in service. The device includes an arresting mechanism operable to lock the shaft to the housing which is actuated when at least one of a certain speed of rotation or a certain angular acceleration of the shaft is exceeded. The device also includes an inertia operated system sensitive to bodily acceleration of the device in at least one plane for actuating said arresting mechanism.

19 Claims, 44 Drawing Figures

Patented Aug. 28, 1973

Inventor:
Hubert Nöhren

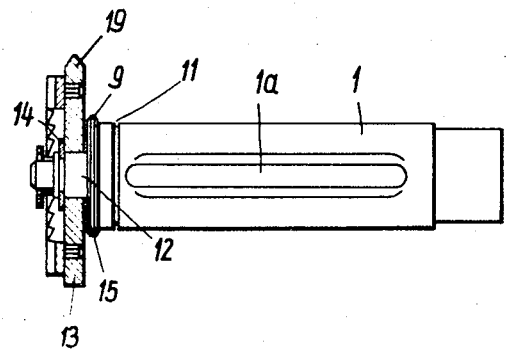
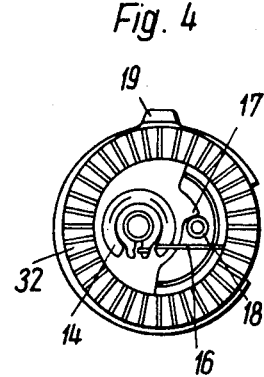
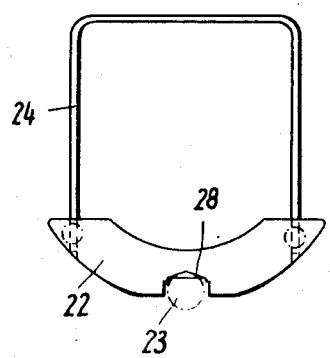
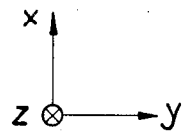

Patented Aug. 28, 1973 3,754,722

Inventor:
Hubert Nöhren
By
Walter Becker

Patented Aug. 28, 1973

Inventor:
Hubert Nögren
By Walter Becky

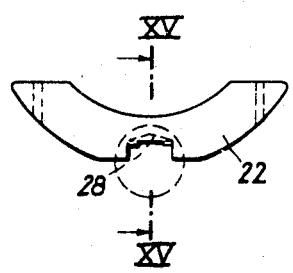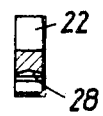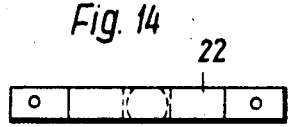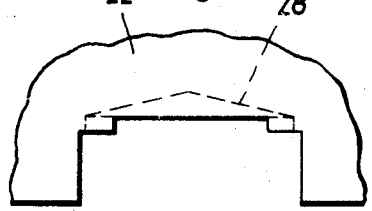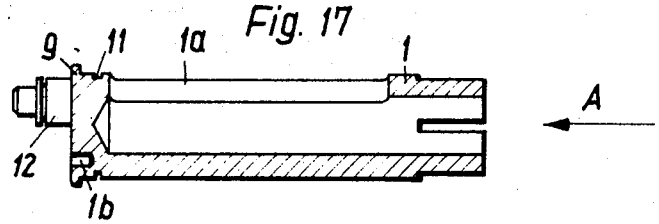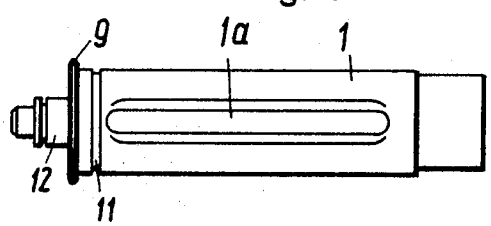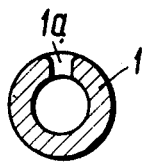

Patented Aug. 28, 1973 3,754,722

Inventor:
Hobert Nöhren
By

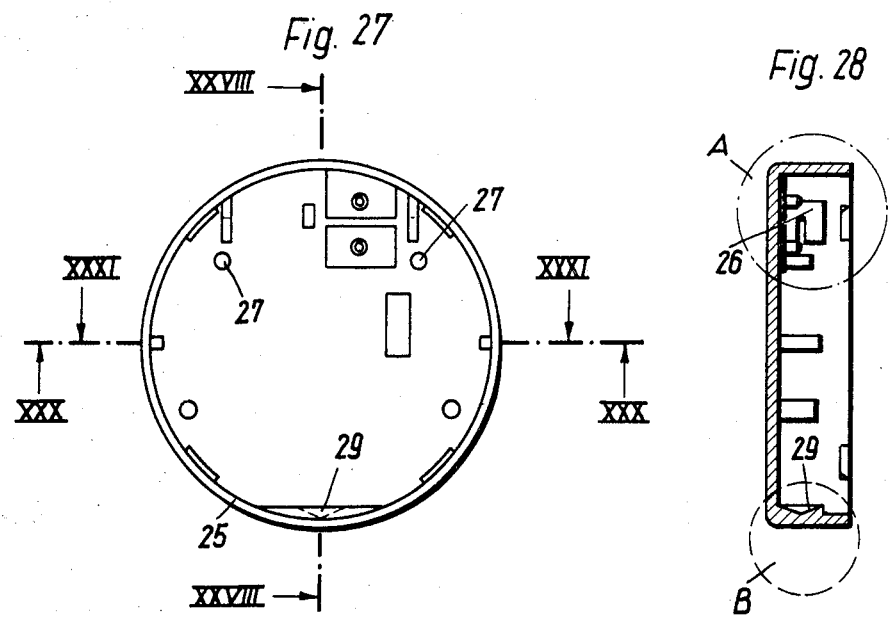
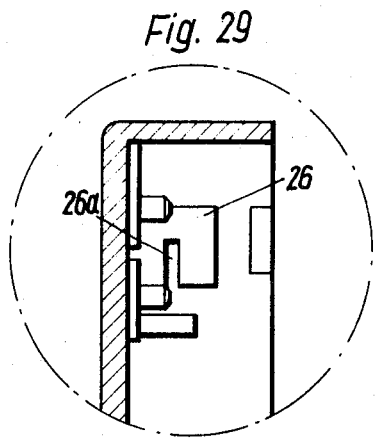
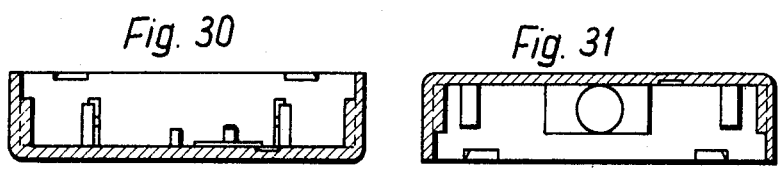

Patented Aug. 28, 1973 3,754,722

Inventor:
Hubert Näpren
By
Castin Becker

Patented Aug. 28, 1973

Inventor:
Hebert Nöpren
By Walter Becker

Patented Aug. 28, 1973  3,754,722

SELF-LOCKING WINDING DEVICE FOR THE SAFETY BELT OF AIR AND LAND VEHICLES

The present invention relates to a self-locking winding device for the safety belt of persons, for instance, in air and land vehicles, according to which a spring urged shaft journalled in a housing is, for purposes of winding up the belt or strap, connected to a structural element or locking member which is disc-shaped and is sluggish with regard to accelerating forces. This structural member responds at least at a pre-determined limit value of the speed at which the belt winds off the shaft and is so designed that at least a rotary movement of the shaft about its longitudinal axis imparts upon said structural member an eccentric movement when the speed of rotation of the shaft exceeds said predetermined limit value, whereupon said structural member abuts at least against one fixed point in the housing, or the like, and establishes a coupling connection between the shaft and the housing, if desired a direct coupling connection.

There has been developed a self-locking winding device for the connecting strap of a safety belt in fast moving vehicles, according to which, a spring-urged shaft journalled in a housing is connected with a structural element which is sluggish with regard to acceleration forces and which responds to predetermined limit value of the speed of the belt winding off from the shaft and is so designed and connected to one end of the shaft that a rotary movement of the shaft about its longitudinal axis imparts upon the said sluggish structural member an eccentric movement when the speed of rotation of the shaft exceeds the said predetermined limit value. Thereupon, the said structural member impacts upon a fixed point on the housing and creates a rigid connection between the shaft and the housing. The said winding device is characterized in that the said structural member is positively connected to the shaft and has at least a further abutment which creates a rigid connection between the shaft and the structural member when the eccentric movement has moved said structural member from its normal position into its blocking position.

A further feature of the above structure consists in that the structural member is designed primarily as a circular disc which has an inertia of such a magnitude that the indifferently journalled disc will be deviated only when a certain rotary acceleration has been obtained.

With the heretofore known device of the above mentioned general type, the sluggish structural member is journalled on a bolt which, due to the necessity of the small size of the entire device, must also be very small, but nevertheless must be able in case of emergency to absorb the total force exerted by a person thereon forward upon the belt. The bolt forms the weakest link in the chain of parts conveying the respective force onto the housing. The said heretofore-known device, moreover, has the disadvantage that dust or hardened oil will, within the range of said structural member, deposit and collect between the latter and the jaws of the head of the shaft which surround said structural member so that the functions of the structural member, which latter may, for instance, be a pawl, may seriously be affected.

Further self-locking winding devices have become known and, more specifically, such in which the locking operation is brought about by a movement of parts in the direction of the longitudinal axis of the shaft, which parts are connected to the shaft for winding up the belt. This movement must, in a relatively complicated manner, be converted into a movement effected in a radial direction with regard to said longitudinal axis and this movement again creats a tangential movement. As a result thereof, an undue great number of structural elements is necessary with the above mentioned heretofore known winding devices so that these devices are not only expensive, but even in spite of the selection of the best materials may show premature wear and failures in function.

In contrast to the just mentioned heretofore known devices, the device referred to above as described in the may be designed in a rather simple manner. The parts are relatively loosely guided one upon the other, and the construction is non-sensitive with regard to dust and dirt. This is of particular advantage because the ability to function of a self-locking winding device, even over a long period of time, must be secured. Frequently, such device is built into the vehicle when it is bought while perhaps only after a number of years an emergency occurs at which the device is supposed safely to prevent a further pull out of the safety belt. If, over these years, dust has collected in the housing of the device and the original grease or oil has hardened, it will be appreciated that such circumstances can greatly impair the expected function of the device. The structural member designed in the form of a disc may be of sheet metal or may be produced by punching. A post machining of the disc need be effected only at certain areas.

According to a device representing a further development of the subject matter there is provided a self-locking winding device which is characterized primarily in that the blocking disc is journalled on a pin, the two ends of which are connected to the end of the shaft. For this purpose, this area of the shaft has a cut extending transverse to its longitudinal axis, and the pin extends through said cut parallel to the axis of the shaft. The said cut is so deep that the blocking disc journalled on the pin can to the required extent turn from its normal position to its blocking position.

According to a further feature of the invention, the locking disc has a depression, the inner side of which is of a configuration corresponding to the cross section of the base of the U-shape at the shaft end, so that the depression will in the blocking position of the disc be located in a closing manner around the U-base. The housing of the arrangement set forth above has nine abutment cams which are arranged uniformly spaced around the path of movement of the blocking finger of the blocking disc. The abutment edges of the abutment cams on one hand and the abutment edges of the blocking fingers on the other hand have such an inclination with regard to the device as a unit that both abutment edges in their blocking position engage each other surface to surface. The abutment cams are with the said older application formed on the housing by an angular cut-in of the housing material and by pressing the surface parts between the cuts out of the surface plane. A bow spring acting between the blocking disc and the shaft is adjustable inasmuch as that end of a bow spring which is connected to the shaft is connected to holding means which in the manner of arms is mounted on the correspondingly extended pin for mounting the blocking disc, which pin extends beyond the outer U-shaped leg. Said holding means is pivotable about the axis of the pin and can be arrested so that that end of the bow spring which is connected to the holding means is adapted in a decreasing or increasing manner of the bow to be displaced.

The self-locking winding up device has the advantage that the blocking disc comprises a reinforced bearing means which in its turn permits a reinforced design of the disc. When the disc is made, for instance, of a piece of sheet steel, the thickness of the sheet may be selected relatively great.

It is an object of the present invention to further improve the above outlined winding device.

This object and other objects and advantages of the invention will appear more clearly from the following specification in connection with the accompanying drawings, in which:

FIG. 3 shows a view of a composition of the structural groups comprising the winding-up shaft for the safety belt and the blocking member.

FIG. 4 is a side view of FIG. 3.

FIG. 5 shows a side view of the mass of inertia.

FIG. 6 is an end view of FIG. 5.

FIG. 13 is a mass of inertia in side view.

FIG. 14 is a top view of FIG. 13.

FIG. 15 represents a section taken along the line XV—XV of FIG. 13.

FIG. 16 illustrates on a larger scale than FIG. 13 a cutout of the latter, said cutout being indicated in FIG. 13 by a dash-line circle.

FIG. 17 is a section through the winding-up shaft for the safety belt.

FIG. 18 is a top view of FIG. 17.

FIG. 19 shows a cross section through the central longitudinal range of the shaft according to FIG. 17.

FIG. 20 is a view of FIG. 17 as seen in the direction of the character A.

FIG. 27 is a top view of the cover cap which receives the inertia system.

FIG. 28 is a section taken along the line XXVIII—XXVIII of FIG. 27.

FIG. 29 shows on a larger scale than FIG. 28, the portion illustrated in FIG. 28 in a dot-dash line A.

FIG. 30 represents a section taken along the line XXX—XXX of FIG. 27.

FIG. 31 is a section taken along the line XXXI—XXXI of FIG. 27.

Figure 1:
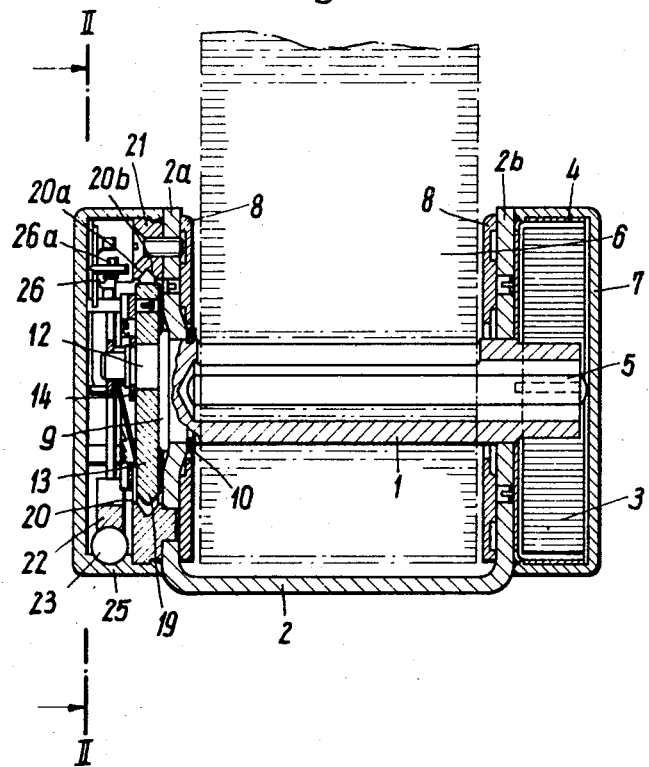
FIG. 1 is a cross section through a self-locking winding device according to the invention, in which important individual elements are located in the plane in which the section has been taken.

Starting with the self-locking winding-up device of the above mennioned type, the problem underlying the present invention has been solved by an arrangement according to the present invention which is characterized primarily in that the locking member, at least when the belt winding off the shaft exceeds the limit speed, is frictionally brought into coupling engagement with an annular bearing which rotates about the locking member so as to prevent a further pull-out of the belt.

This brings about the advantage that the blocking member will, in any rotary position in response to the limit speed of the belt winding off the shaft be adapted immediately to engage the annular bearing in such a way that a further pull-out of the belt will be impossible. The annular bearing thus represents for all practical purposes an infinite number of abutment surfaces for the blocking of the belt when, if desired, the predeterminable adjustable pull-out speed is exceeded.

According to a further feature of the invention, the disc-shaped blocking member is pivotally mounted on a pivot for pivoting about a limited angle, said pivot being eccentrically located at one end of the shaft and being eccentrically arranged with regard to the longitudinal axis of the shaft. The blocking member is characterized particularly in that it is balanced with regard to its pivot movement about the eccentrically arranged pivot.

A further feature of the invention consists in that the annular bearing is provided with at least one friction surface against which the blocking member rests by means of a finger-shaped extension when said frictional surface is in coupling engagement.

According to a particularly advantageous embodiment of the invention, the annular bearing is provided with a circular groove engaged by corresponding friction surfaces of the finger-shaped extension when said finger-shaped extension is in coupling position.

It is particularly advantageous when in conformity with a further feature of the invention, the groove of the annular bearing is designed as a wedge-shaped groove while the finger-shaped extension by means of a corresponding wedge-shaped point engages the groove in coupling position.

According to the invention, the wedge-shaped groove angle and the wedge angle of the finger-shaped extension may amount to from 50° to 75°, preferably 60°.

In some instances it may be advantageous to have the height of the finger-shaped extension of the blocking member amount to approximately from a fourteenth to a sixteenth of the diameter of the disc-shaped blocking member.

Advantageously, the finger-shaped extension protrudes in a tooth-like manner beyond the outer circumferential surface of the disc-shaped locking member and at the foot area merging with the blocking member is in circumferential direction of the blocking member approximately from 3.5 to 10 millimeters wide, whereas the extension at its free end is narrower. In this way, a space saving and rigid design of the blocking member is obtained so that also high shock-like stresses can safely be absorbed.

According to a further feature of the invention, the annular bearing may be exchangeably arrangd on the housing as a unit. In this way, the winding-up device according to the invention can also easily be installed. If it should become necessary, additionally the annular bearing may be exchanged for a new bearing by a few manual operations. Such an emergency may arise, for instance, when due to undue and frequent shock-wise stresses, the friction surfaces have worn off. In order to counteract this drawback, the friction surfaces of the wedge-shaped groove and of the finger-shaped extension may consist of a wear-resistant material or may be coated therwith. For instance the wedge-shaped groove and/or the finger-shaped extension may be provided with a friction increasing coat or layer of synthetic material.

According to a preferred embodiment of the invention, in addition to blocking the belt by means of belt pull-out accelerations, a blocking of the belt is also possible by accelerations acting upon the desired device. To this end, the disc-shaped blocking member may have associated therewith a mass of energy which through a lever system in response to exceeding the acceleration exerted upon the entire device, the blocking member pivots about the eccentric pivot in such a way that the finger-shaped extension frictionally engages the wedge-shaped group and exerts a blocking action.

In this way, it will practically in a two-fold manner be assures that the belt is in an emergency blocking in the winding-up device. Extreme situations may, for instance, occur due to the fact that a passenger car overturns or that the shoulders of the driver carry out certain movements which under certain circumstances do not bring about the limit pull-out speed of the belt and consequently would then not block the belt. Also, situations are possible in which a motor vehicle drives over a high bump on the ground so that a shock-like lifting and lowering movement occurs. In all these instances which transfer acceleration forces directly upon the entire winding-up device and thereby onto the mass of energy, it will be assured that through the intervention of the lever system, the disc-shaped locking member is directed into the wedge-shaped groove and thereby is brought into blocking position.

The lever system may be relatively weak and small because practically it has to transmit only very low forces. Forces which are to be absorbed by the belt during a blocking action are not at all transferred by the lever system which is to be considered merely to represent a control mechanism, inasmuch as such blocking forces can act only upon the annular bearing, the shaft, the belt, and the blocking member.

In conformity with the present invention, a gear ring equipped with a plurality of teeth is non-rotatably coupled to the blocking member while a lever actuated in response to the exceeding of a limit acceleration exerted upon the device and, if desired, adjustably engages the tooth spaces of said gear ring and brings about the pivoting of the blocking member into coupling position with the annular bearing. Since, as indicated, the lever system has to transmit only very small forces, the gear ring can be light and small and may consist, for instance, of synthetic material or light metal.

It is advisable to provide the mass of inertia in the vicinity of the blocking member on a ball in a cover cap laterally arranged in the housing while said ball is journaled with a minimum of friction so that said ball is movable in space by a limited extent. To this end, the mass of inertia and also the oppositely located surface of the cover cap or the like on which the ball is located may be provided with a corresponding blind bore or depression. In response to an acceleration (positive or negative) acting upon the device, for instance, the vehicle, it will be appreciated that from a certain acceleration value on a pivoting of the mass of inertia and thus a lifting movement will occur. In this connection, the sinking angle of counter-sinking may be influential. This lifting movement is taken advantage of for acting through the lever system upon the gear ring and thereby upon the locking member coupled with said lever system and gear ring in such a way that the blocking member will be brought into coupling engagement with the annular bearing, as a result of which, the belt is blocked instantaneously.

According to the present invention, the mass of inertia is coupled to a U-shaped wire yoke which is mounted in camshaped protrusions of the cover cap.

According to a further feature of the invention, the U-shaped wire yoke has connected thereto a lever which is adapted directly or indirectly to act upon the gear ring of the blocking member.

A leg spring is coupled to the free end of the lever, whereas a ball spring is connected to the web of the U-shaped wire yoke. The complete inertia system is infinitely variable by turning the cover cap so that most mountings in different vehicles can be covered.

Referring now to the drawings in detail, the drawings show a self-locking winding device for motor vehicle safety belts. The self-locking winding device comprises a shaft or winding-up shaft 1 for a safety belt 6. Shaft 1 is rotatably journaled in a housing 2. The arrangement furthermore comprises a return spring 3 which in the specific embodiment shown is a leaf spring or spiral spring. This return spring is arranged in a spring housing 4 in such a way that the safety belt 6 which is, by means of a pin 5, connected to shaft 1 having a longitudinal slot 1a will wind itself up automatically. The spring housing 4 fixedly connected to the housing 2 is closed from the outside by a cover cap 7.

Figure 21:
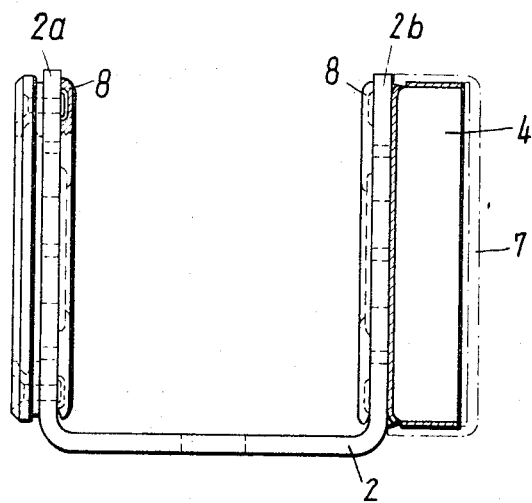
FIG. 21 represents a housing according to a winding-up device of the present invention.
Figure 22:
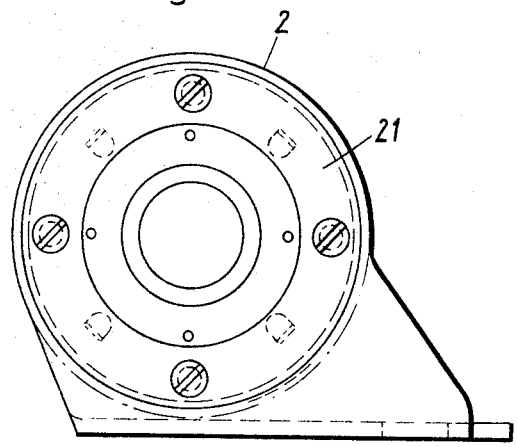
FIG. 22 is a side view of FIG. 21.
Figure 23:
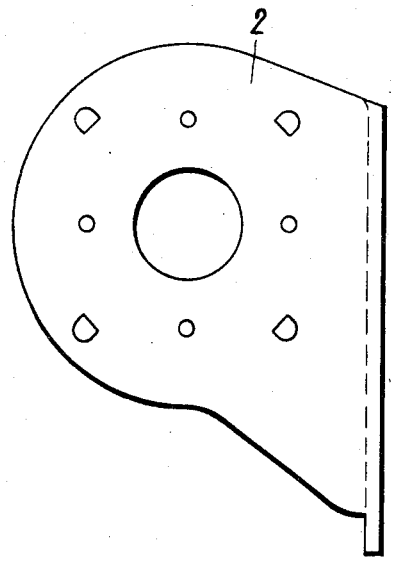
FIG. 23 shows the housing in side view.
Figure 25:
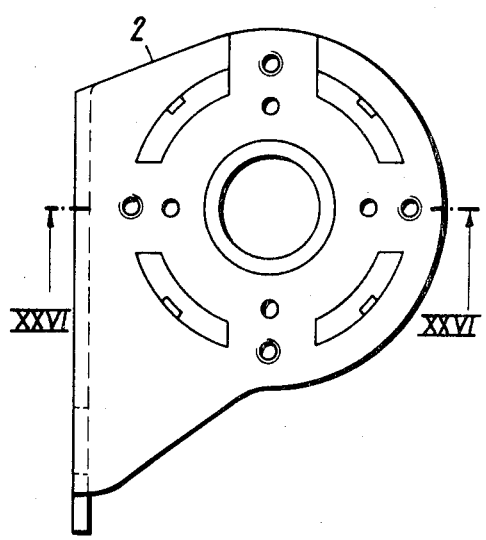
FIG. 25 shows a view of the other end face of the housing.
Figure 24:
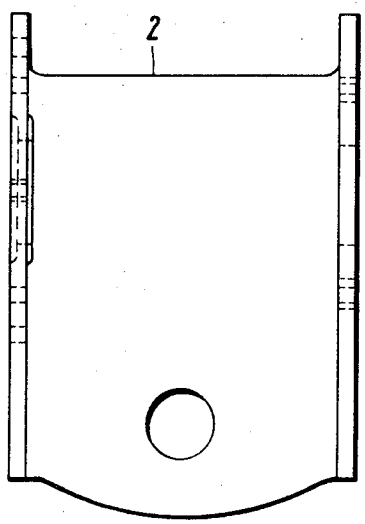
FIG. 24 is an end view of FIG. 23.
Figure 33:
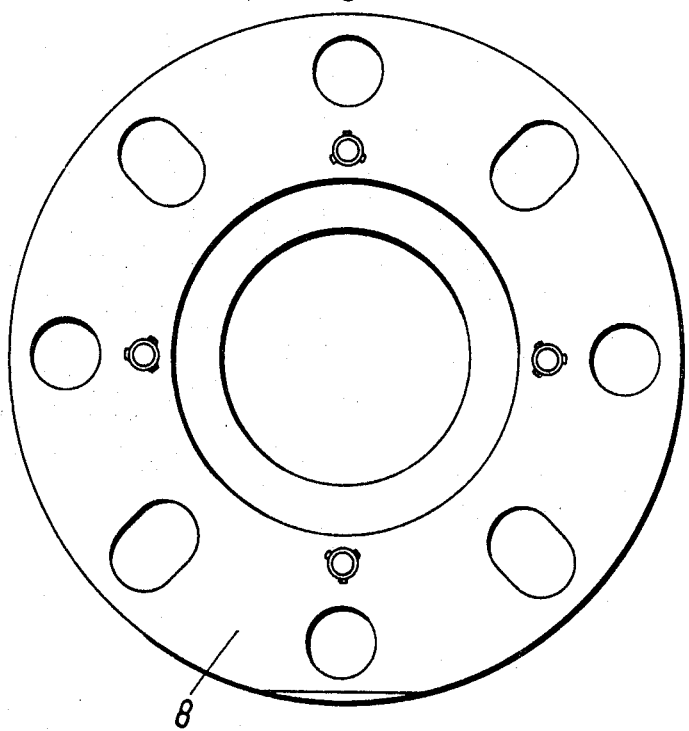
FIG. 33 is a top view of a lateral confining disc.
Figure 34:
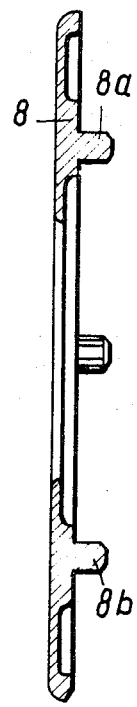
FIG. 34 illustrates a section through the confining disc shown in FIG. 33.

For purposes of saving the safety belt, smooth confining discs 8 are provided within the winding-up range of belt 6 between legs 2a, 2b having a U-shape. The construction of the discs 8 is particularly clearly shown in FIGS. 33 and 34, whereas the connection of said discs to the legs 2a, 2b is shown in FIGS. 1, 21 and 22. The surface regions pertaining to the confining discs 8 and facing toward the U-shaped legs 2a, 2b are provided with bolts 8A, 8b which in the manner of notch pins have their circumferential surfaces provided with beads or thickened portions. The said bolts 8a, 8b engage correspondingly designed openings of the U-shaped legs 2a, 2b under load.

Figure 26:
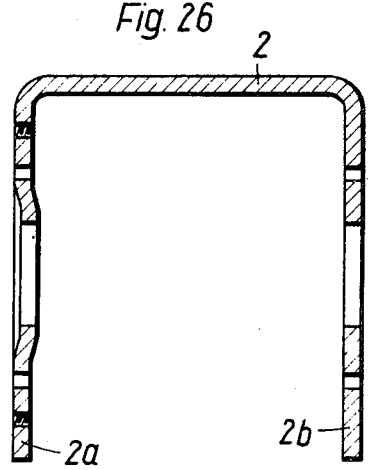
FIG. 26 is a section taken along the line XXVI—XXVI of FIG. 25.
Figure 32:
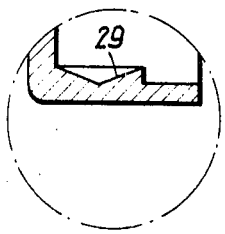
FIG. 32 illustrates on a larger scale than FIG. 28 that portion thereof which is shown in FIG. 28 in a dash-line circle designated with the character B.

As particularly shown in FIG. 26, housing 2 when seen from the side has a U-shaped contour. The U-legs 2a, 2b located opposite to each other have recesses or bores 2' in which shaft 1 is rotatably journaled.

For purposes of securing the axial position of shaft 1 there are provided a section or step 9 and a safety ring 10 arranged in groove 11.

Figure 7:
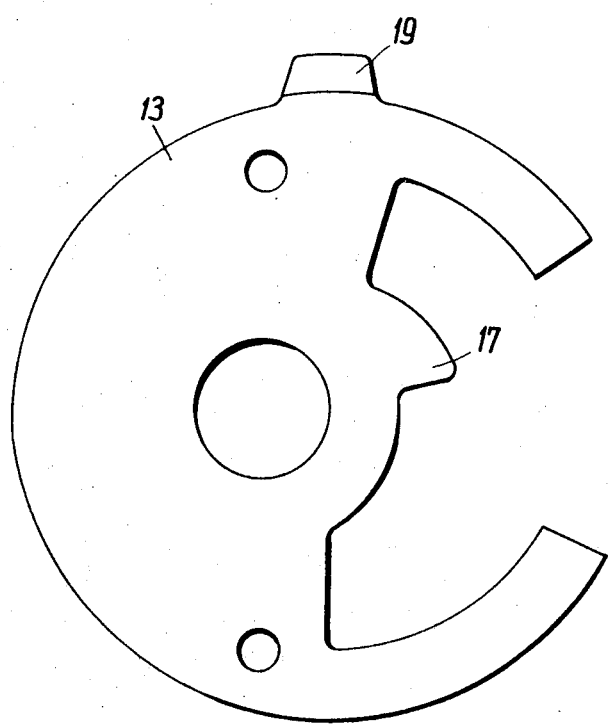
FIG. 7 shows a top view of a disc-shaped blocking member according to the invention.
Figure 8:
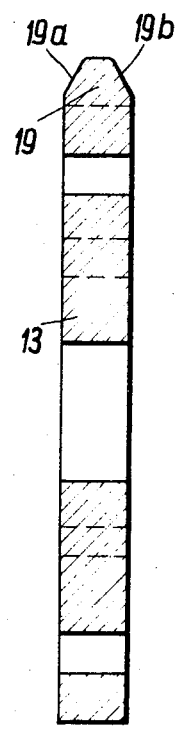
FIG. 8 is a side view of FIG. 7.
Figure 9:
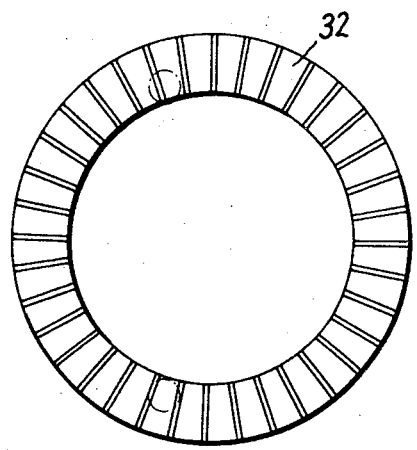
FIG. 9 is a top view of a gear ring according to the invention.
Figure 10:
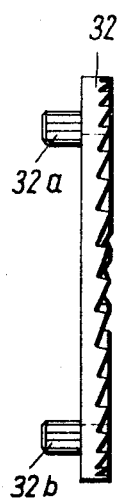
FIG. 10 is a side view of FIG. 9.
Figure 11:
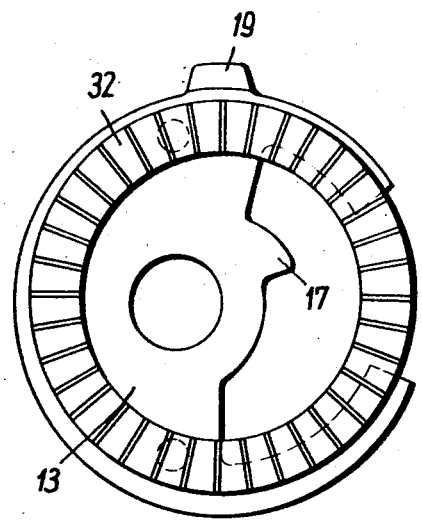
FIG. 11 is a top view of the locking member built as a unit with the gear ring.

Shaft 1 is provided with an eccentrically arranged pin 12 having pivotally mounted thereon a disc-shaped blocking member 13. Member 13 is particularly clearly shown in FIGS. 7 and 8. As will be evident from FIG. 3, the disc-shaped blocking member 13 is, by means of a safety ring 14, secured against axial movements. A washer 15 serves for reducing the lateral friction on the blocking member 13 which latter is balanced with regard to its rotation about pivot 12.

Figure 2:
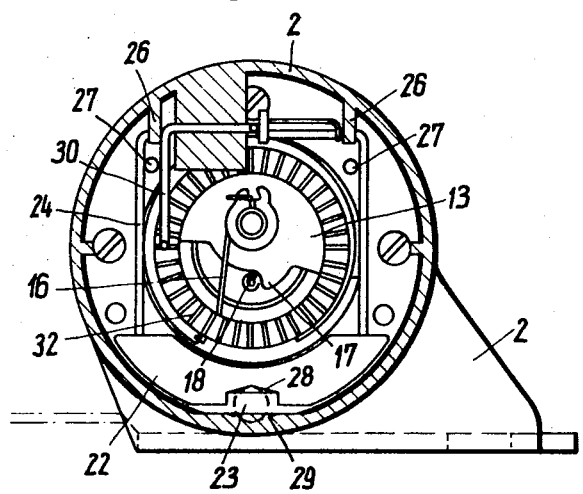
FIG. 2 is a section taken along the line II—II of FIG. 1.

Reference numeral 16 designates a leg spring which is particularly clearly shown in FIGS. 2 and 4. Leg spring 16 loads the disc-shaped locking member in such a way that in rest position a cam 17 abuts against a pin 18 arranged in shaft 1. To this end, shaft 1 has a blind bore 1b in which pin 18 is fastened.

In response to a rotary acceleration of shaft 1 as may be caused by a pull-out acceleration of the safety belt 6, the disc-shaped blocking member 13 will, in view of its inertia first lag somewhat as to its rotary movement with regard to shaft 1 and consequently turns about the eccentric pin 12. As a result thereof, a tooth-shaped extension of the blocking member 13 which forms one piece with the blocking member 13 increases its distance from the turning point of shaft 1 and engages the inner side 20 of the bearing (pressure ring) 21 which is of an annular shape and is connected to the housing 2. The frictional resistance between the blocking member 13 and the annular counter bearing 21 is so great that an immediate blocking of shaft 1 and consequently also of the belt 6 occurs.

Figure 42:
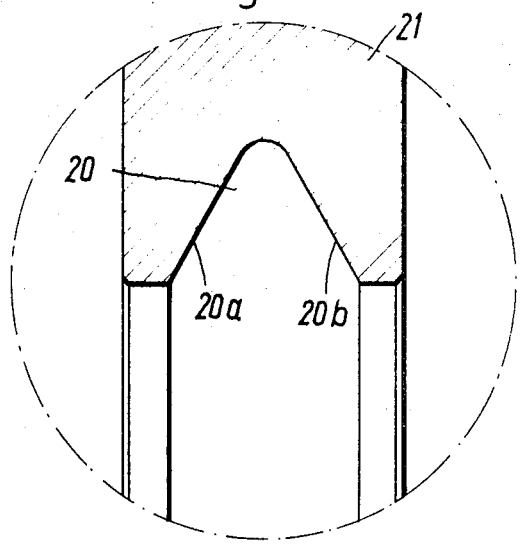
FIG. 42 illustrates on a larger scale than FIG. 41 that portion of the latter which is encircled by a dot-dash Z.
Figure 43:
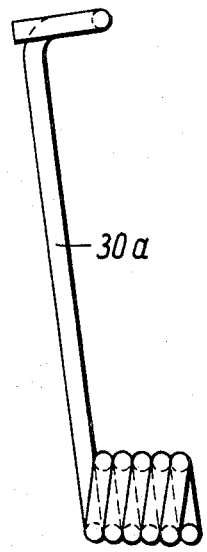
FIG. 43 is a top view of an angle spring.
Figure 44:
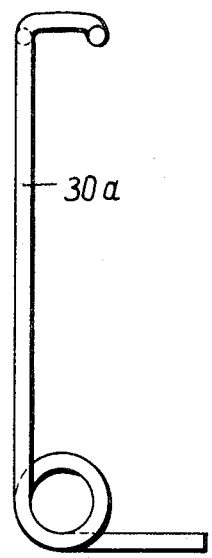
FIG. 44 is a side view of an angle spring.

As will be evident in particular from FIGS. 1 and 42, the annular counter bearing 21 is provided with a wedge-shaped groove 20 having the wedge surfaces 20a and 20b. The tooth-shaped extension 19 of the disc-shaped blocking member 13 is designed in conformity with the wedge groove 20 and loads the wedge surfaces 19a, 19b. The preload of leg spring 16 or its mounting may, if desired, be adjustable whereby the limit acceleration at which the disc-shaped blocking member is pivoted into blocking position can be varied. In addition to the blocking possibility by exceeding a limit acceleration of the blocking member 13 during the pull-out of the belt, a belt locking effect can, with the embodiment according to the invention, also be realized by accelerations which act upon the entire self-locking winding device. In order to make this possible, the device according to the present invention has a mass 22 of inertia as will be evident from FIGS. 5, 6 and 13 to 16, which inertia mass 22 is arranged in the vicinity of the blocking member 13. The mass of inertia 22 is journaled on a ball 23 and is connected to a wire yoke 24 which is supported in the slots 26a of cams 26 (FIGS. 1, 27 to 29) and the pivot 27 at the cover cap 25. The supporting area for ball 23 in the inertia mass 22 and in the cover cap 25 is designed as a conical countersunk 28, 29 so that in vertical position of the inertia mass 22 (X—X axis in FIG. 5) an automatic locating or centering of the position of said mass of inertia is obtained.

Figure 12:
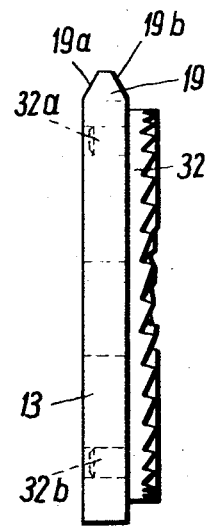
FIG. 12 is a side view of FIG. 11.
Figure 38:
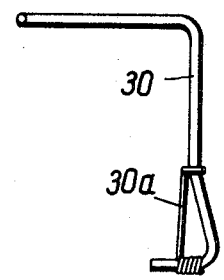
FIG. 38 is a top view of a blocking lever with a mounted leg spring.

In response to an acceleration (positive or negative) acting upon the device (land or air vehicles) in the Y-Z plane, from a certain acceleration value on a deviation of the inertia mass 22 occurs and consequently also a lifting movement in the X direction. Important for the lifting movement is the design of the countersunk or depressions 28, 29 (sinking angle). This lifting movement is, through the intervention of a lever 30 (see FIGS. 2, 38 and 39), transferred to a gear ring 32 which, in the illustrated embodiment of the invention, consists of a synthetic material and in circumferential direction has a considerable number of teeth. Connected to the gear ring is a plurality of bolt-shaped protrusions 32a, 32b which may be designed in the manner of notch pins and may, under load, engage recesses of the disc-shaped blocking member (FIG. 12). In response to a lifting movement of the inertia mass 22, lever 30 engages the tooth spaces of the gear ring 32. In response to a lifting movement of the inertia mass 22, lever 30 through the intervention of a leg of spring 30a engages the tooth space of gear ring 32. Spring 30a is non-rotatably coupled to lever 30. Since gear ring 32 is non-rotatably connected to the disc-shaped blocking member 13, an engagement of a tooth space of gear ring 32 by lever 30 through spring 30a brings about a deviation of the disc-shaped blocking member 13 in such a way that the blocking member 13 will engage the wedge-shaped groove 20 whereby the desired blocking of the safety belt will be obtained. When the acceleration ceases or when the blocking force transferred to the blocking member 13 is eliminated, said blocking member 13 is pivoted back to its starting position about the pivot 12 so that belt 6 can, if desired, be pulled out again. When a motor vehicle turns over or during stunt flying, likewise a blocking of the safety belt 6 occurs. The complete inertia system comprising cover cap 25, inertia mass 22, ball 23, wire yoke 24, and lever 30, is infinitely fine adjustable or turnable in the X-Y plane about an angle of 360°.

Figure 35:
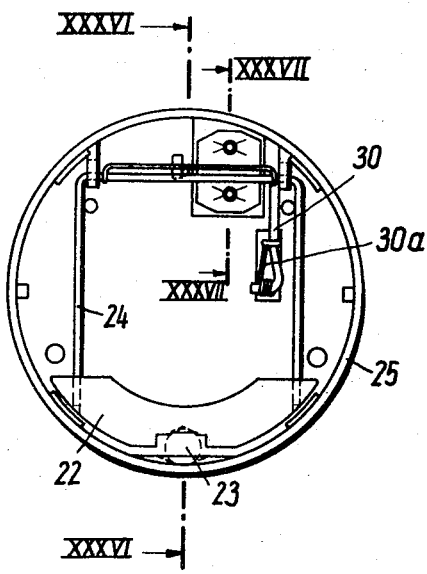
FIG. 35 is a top view of the inertia system mounted in the cover cap.
Figure 36:
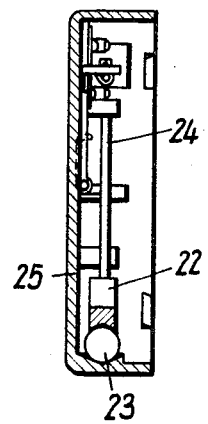
FIG. 36 is a section taken along the line XXXVI—XXXVI of FIG. 35.
Figure 37:
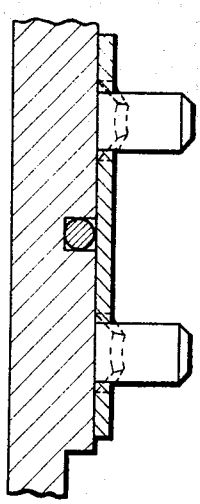
FIG. 37 is a section taken along the line XXXVII—XXXVII of FIG. 35.
Figure 39:
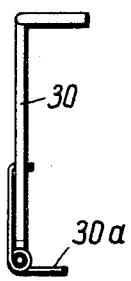
FIG. 39 is a side view of FIG. 38.
Figure 40:
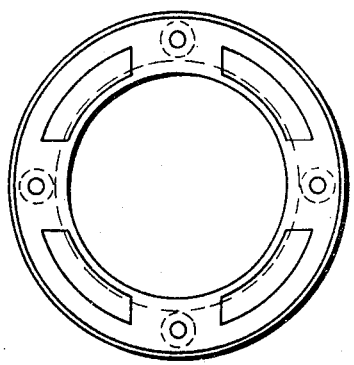
FIG. 40 is a top view of an annular counter bearing.
Figure 41:
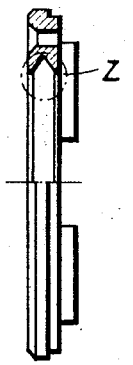
FIG. 41 is a partial section through the bearing of FIG. 40.

With reference to FIG. 35, it will be noted that according to a further feature of the invention, the web of the U-shaped wire yoke 24 has a bar spring 100 coupled thereto. As shown in FIG. 39, the blocking lever 30 has a rectangularly cranked-off section 30b which rests on the U-shaped portion of the wire yoke 24 (see FIG. 35). Bar spring 100 extends over the cranked-off section 30b and in this way establishes a connection between the U-shaped wire yoke 24 and the blocking lever 30. Consequently, blocking lever 30 and spring 30a will follow all movements of the U-shaped yoke 24 and mass 22 of inertia. Moreover, blocking lever 30 with spring 30a cannot automatically blockingly engage the tooth spaces.

According to a further feature of the invention, the contacting pressure of the vehicle acceleration responsive inertia mass 22 may be variable by an adjustable spring in such a way that inertia mass 22 cannot by its total weight act upon ball 23. This brings about that if a vehicle would fall into the water, the blocking device will become effective also when no major acceleration forces are transmitted. In response to a fall, the inertia mass 22 would logically have to be lifted in upward direction. In these circumstances it will be evident that if the inertia mass 22 is pressed upwardly, i.e. so to speak, relieved, the blocking device will respond earlier and better.

It is, of course, to be understood that the features described in the above mentioned drawings may, individually, or in any desired combination with each other be important for the realization of the invention in their different forms. It is also to be understood that the present invention is not limited to the specific arrangements shown in the accompanying drawings.

What is claimed is:

1. A self-locking wind up device for the safety belt of a passenger vehicle comprising: a housing adapted for being fixedly mounted in the vehicle, a shaft rotatable in the housing and adapted for connection to the belt to be wound up, a spring in the housing biasing said shaft in the winding up direction, an inertia member mounted on said shaft normally biased to a predetermined position thereon and adapted to move away from said position in response to at least one of a predetermined limiting speed of rotation and predetermined limiting acceleration of said shaft, and a friction ring fixed in said housing in the plane of said inertia member, said inertia member normally rotating with said shaft freely in said friction ring but having a region engageable with said friction ring upon movement of said inertia member away from said predertimined position on said shaft, said inertia member arresting said shaft when engaging said friction ring in every suitable rotational position upon exceeding the limit of rotational acceleration of the belt unwinding from the shaft at any of an infinite number of positions, said region of said inertia member comprising a generally radial finger-like extension thereon and said friction ring having a radially inwardly opening annular groove adapted for frictional engagement by said extension.

2. A self-locking wind up device for the safety belt of a passenger vehicle comprising: a housing adapted for being fixedly mounted in the vehicle, a shaft rotatable in the housing and adapted for connection to the belt to be wound up, a spring in the housing biasing said shaft in the winding up direction, an inertia member mounted on said shaft normally biased to a predetermined position thereon and adapted to move away from said position in response to at least one of a predetermined limiting speed of rotation and predetermined limiting acceleration of said shaft, and a friction ring fixed in said housing in the plane of said inertia member, said inertia member normally rotating with said shaft freely in said friction ring but having a region engageable with said friction ring upon movement of said inertia member away from said predetermined position on said shaft, said inertia member arresting said shaft when engaging said friction ring, said region of said inertia member comprising a generally radial finger-like extension thereon and said friction ring having a radially inwardly opening annular groove adapted for frictional engagement by said extension, said groove being wedge shaped in cross section and at least the outer end of said extension being formed to a complementary wedge shape.

3. A device according to claim 2 in which said inertia member is disc-like, an eccentric pin on one end of said shaft, and said inertia member being rotatably mounted on said pin.

4. A device according to claim 2 in which said friction ring comprises a radially inwardly facing friction surface adapted for engagement with said region of said inertia member.

5. A device according to claim 2 in which the included angle between the sides of said groove in said friction ring and between the sides of the wedge shape on said extension is within the range of from about 50° to about 75°.

6. A device according to claim 2 in which said inertia member is disc-like and the height of said extension amounts to about one-fourteenth to one-sixteenth of the diameter of the inertia member.

7. A self-locking wind up device for the safety belt of a passenger vehicle comprising: a housing adapted for being fixedly mounted in the vehicle, a shaft rotatable in the housing and adapted for connection to the belt to be wound up, a spring in the housing biasing said shaft in the winding up direction, an inertia member mounted on said shaft normally biased to a predetermined position thereon and adapted to move away from said position in response to at least one of a predetermined limiting speed of rotation and predetermined limiting acceleration of said shaft, and a friction ring fixed in said housing in the plane of said inertia member, said inertia member normally rotating with said shaft freely in said friction ring but having a region engageable with said friction ring upon movement of said inertia member away from said predetermined position on said shaft, said inertia member arresting said shaft when engaging said friction ring, said region of said inertia member comprising a generally radial finger-like extension thereon and said friction ring having a radially inwardly opening annular groove adapted for frictional engagement by said extension, said inertia member being disc-like and said extension being in the form of a tooth protruding radially from the outer circumferential surface of said inertia member, the said extension merging with said inertia member at the base of said extension, said extension in a circumferential direction of said inertia member having width of from about 3.5 millimeters to about 10 millimeters at the base thereof.

8. A device according to claim 2 in which said friction ring is in the form of a single ring element fixedly but releasably secured to said housing.

9. A device according to claim 2 which includes means operable upon a predetermined degree of bodily acceleration of said device to effect movement of said inertia member into locking engagement with said friction ring.

10. A device according to claim 9 in which said last mentioned means comprises an inertia mass carried by said housing and lever means under the control of said inertia mass and operable upon movement of said inertia mass relative to said housing to actuate said inertia member into locking engagement with said friction ring.

11. A self-locking wind up device for the safety belt of a passenger vehicle comprising: a housing adapted for being fixedly mounted in the vehicle, a shaft rotatable in the housing and adapted for connection to the belt to be wound up, a spring in the housing biasing said shaft in the winding up direction, an inertia member mounted on said shaft normally biased to a predetermined position thereon and adapted to move away from said position in response to at least one of a predetermined limiting speed of rotation and predetermined limiting acceleration of said shaft, and a friction ring fixed in said housing in the plane of said inertia member, said inertia member normally rotating with said shaft freely in said friction ring but having a region engageable with said friction ring upon movement of said inertia member away from said predetermined position on said shaft, said inertia member arresting said shaft when engaging said friction ring, means operable upon a predetermined degree of bodily acceleration of said device to effect movement of said inertia member into locking engagement with said friction ring, said last mentioned means comprising an inertia mass carried by said housing and lever means under the control of said inertia mass and operable upon movement of said inertia mass relative to said housing to actuate said inertia member into locking engagement with said friction ring, and a toothed ring connected to said inertia member, said lever means comprising a finger element engageable with a tooth space of said toothed ring for effecting movement of said inertia member in response to movement of said inertia mass.

12. A self-locking wind up device for the safety belt of a passenger vehicle comprising: a housing adapted for being fixedly mounted in the vehicle, a shaft rotatable in the housing and adapted for connection to the belt to be wound up, a spring in the housing biasing said shaft in the winding up direction, an inertia member mounted on said shaft normally biased to a predetermined position thereon and adapted to move away from said position in response to at least one of a predetermined limiting speed of rotation and predetermined limiting acceleration of said shaft, and a friction ring fixed in said housing in the plane of said inertia member, said inertia member normally rotating with said shaft freely in said friction ring but having a region engageable with said friction ring upon movement of said inertia member away from said predetermined position on said shaft, said inertia member arresting said shaft when engaging said friction ring, means operable upon a predetermined degree of bodily acceleration of said device to effect movement of said inertia member into locking engagement with said friction ring, said last mentioned means comprising an inertia mass carried by said housing and lever means under the control of said inertia mass and operable upon movement of said inertia mass relative to said housing to actuate said inertia member into locking engagement with said friction ring, said inertia mass comprising a body having a recess therein, and a bearing carried by said housing and engaging said recess, said mass being moveable in any of three directions to effect actuation of said inertia member into locking engagement with said friction ring.

13. A self-locking wind up device for the safety belt of a passenger vehicle comprising: a housing adapted for being fixedly mounted in the vehicle, a shaft rotatable in the housing and adapted for connection to the belt to be wound up, a spring in the housing biasing said shaft in the winding up direction, an inertia member mounted on said shaft normally biased to a predetermined position thereon and adapted to move away from said position in response to at least one of a predetermined limting speed of rotation and predetermined limiting acceleration of said shaft, and a friction ring fixed in said housing in the plane of said inertia member, said inertia member normally rotating with said shaft freely in said friction ring but having a region engageable with said friction ring upon movement of said inertia member away from said predetermined position on said shaft, said inertia member arresting said shaft when engaging said friction ring, means operable upon a predetermined degree of bodily acceleration of said device to effect movement of said inertia member into locking engagement with said friction ring, said last mentioned means comprising an inertia mass carried by said housing and lever means under the control of said inertia mass and operable upon movement of said inertia mass relative to said housing to actuate said inertia member into locking engagement with said friction ring, a "U" shaped yoke connected to said inertia mass, a cover member on said housing enclosing said inertia mass, and means on said cover member supporting said "U" shaped yoke.

14. A device according to claim 13 in which said lever means includes a lever operatively connected to said yoke and adapted to engage and rotate said toothed wheel in response to movement of the yoke as occasioned by movement of said inertia mass due to acceleration of said device.

15. A device according to claim 14 in which said lever includes a spring leg at one end forming the means for engagement of said lever with said toothed wheel.

16. A device according to claim 15 which includes a bar spring coupled to the closed end of said yoke and operatively connected to said lever.

17. A device according to claim 12 which includes a cover member rotatable on said housing and enclosing said inertia mass, said bearing being carried in said cover member, whereby the response of said inertia mass to acceleration of said device can be varied by rotating said cover member on said housing.

18. A device according to claim 12 which includes resilient means urging said inertia mass toward said bearing, and means for varying the bias of said resilient means on said inertia mass.

19. A device according to claim 12 in which said bearing is in the form of a ball, a cover member rotatably mounted on said housing, said cover member having a recess for receiving said ball, at least one of said recesses in the cover member and inertia mass being conical, said inertia mass and said lever means being entirely supported by said cover member.

* * * * *